United States Patent
Yamamoto et al.

(10) Patent No.: US 7,855,829 B2
(45) Date of Patent: Dec. 21, 2010

(54) PARTICLES FOR DISPLAY, PARTICLE DISPERSION FOR DISPLAY, DISPLAY MEDIUM AND DISPLAY DEVICE

(75) Inventors: Yasuo Yamamoto, Kanagawa (JP); Hiroaki Moriyama, Kanagawa (JP); Yoshinori Machida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/555,465

(22) Filed: Sep. 8, 2009

(65) Prior Publication Data

US 2010/0225998 A1    Sep. 9, 2010

(30) Foreign Application Priority Data

Mar. 9, 2009    (JP) .............. 2009-055349

(51) Int. Cl.
 *G02B 26/00*   (2006.01)
 *G09G 3/34*   (2006.01)
(52) U.S. Cl. ...................... 359/296; 345/107
(58) Field of Classification Search ............ 359/296; 345/107; 430/32; 204/600
 See application file for complete search history.

(56) References Cited

U.S. PATENT DOCUMENTS

| 4,806,443 A | 2/1989 | Yanus et al. |
| 7,692,846 B2 * | 4/2010 | Okuyama et al. ........... 359/296 |
| 2003/0230487 A1 | 12/2003 | Yanagisawa |

FOREIGN PATENT DOCUMENTS

| JP | A-2003-131420 | 5/2003 |
| JP | A-2004-4741 | 1/2004 |
| JP | A-2004-279732 | 10/2004 |
| JP | A-2005-23248 | 1/2005 |

* cited by examiner

*Primary Examiner*—William C Choi
(74) *Attorney, Agent, or Firm*—Oliff & Berridge, PLC

(57) ABSTRACT

Particles for display including color particles and a silicone polymer attached to a surface of the color particles, the silicone polymer including, as copolymerization components, a first silicone chain component, a second silicone component including a silicone chain that is shorter than a silicone chain of the first silicone component, and a component including a charging group.

16 Claims, 5 Drawing Sheets

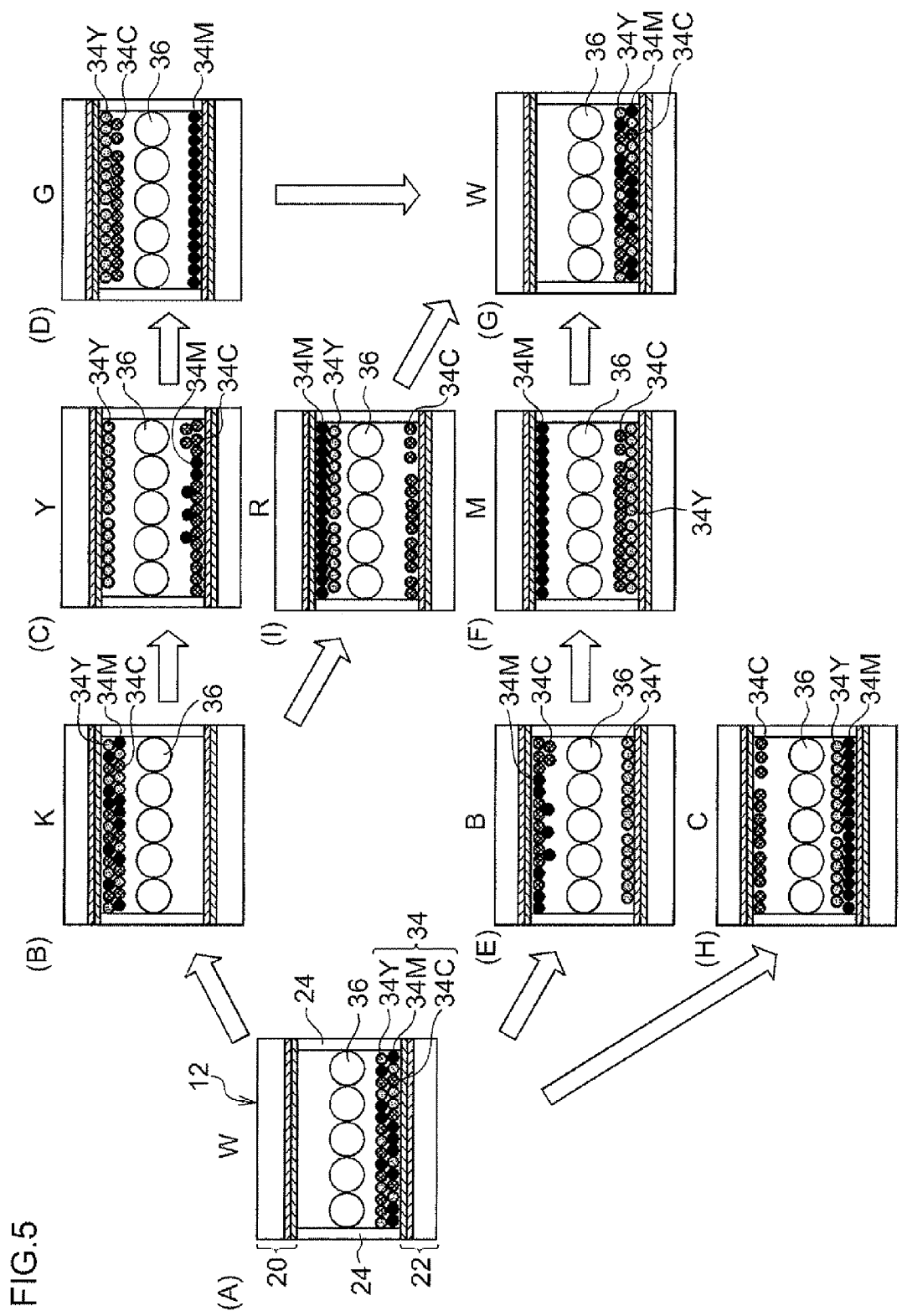

PARTICLES FOR DISPLAY, PARTICLE DISPERSION FOR DISPLAY, DISPLAY MEDIUM AND DISPLAY DEVICE

CROSS-REFERENCE TO RELATED APPLICATION

This application is based on and claims priority under 35 USC 119 from Japanese Patent Application No. 2009-055349 filed Mar. 9, 2009.

BACKGROUND

The invention relates to particles for display, a particle dispersion for display, a display medium, and a display device.

RELATED ART

In these days, studies on electrophoretic display device as a display having a memory property have been intensely conducted. In this display system, an electrophoretic material including charged particles for display (electrophoretic particles) dispersed in a liquid is included in a cell formed by a pair of electrode substrates, and the display is performed by these electrophoresic particles that alternately move in the cell toward the display side and the rear side, upon application of an electric field.

In this technique, the electrophoretic material is a critical element and has been developed from various technical aspects, in order to improve the particles for display (electrophoretic particles) themselves or dispersibility of the same.

SUMMARY

A first aspect of the invention provides particles for display including color particles and a silicone polymer attached to a surface of the color particles, the silicone polymer including, as copolymerization components, a first silicone chain component, a second silicone component including a silicone chain that is shorter than a silicone chain of the first silicone component, and a component including a charging group.

BRIEF DESCRIPTION OF THE DRAWINGS

Exemplary embodiments of the present invention will be described in detail based on the following figures, wherein:

FIG. 5 is a schematic view showing the relationship between the mode of voltage applied between the substrates of the display medium and the mode of movement of particles.

DETAILED DESCRIPTION

Figure 1:
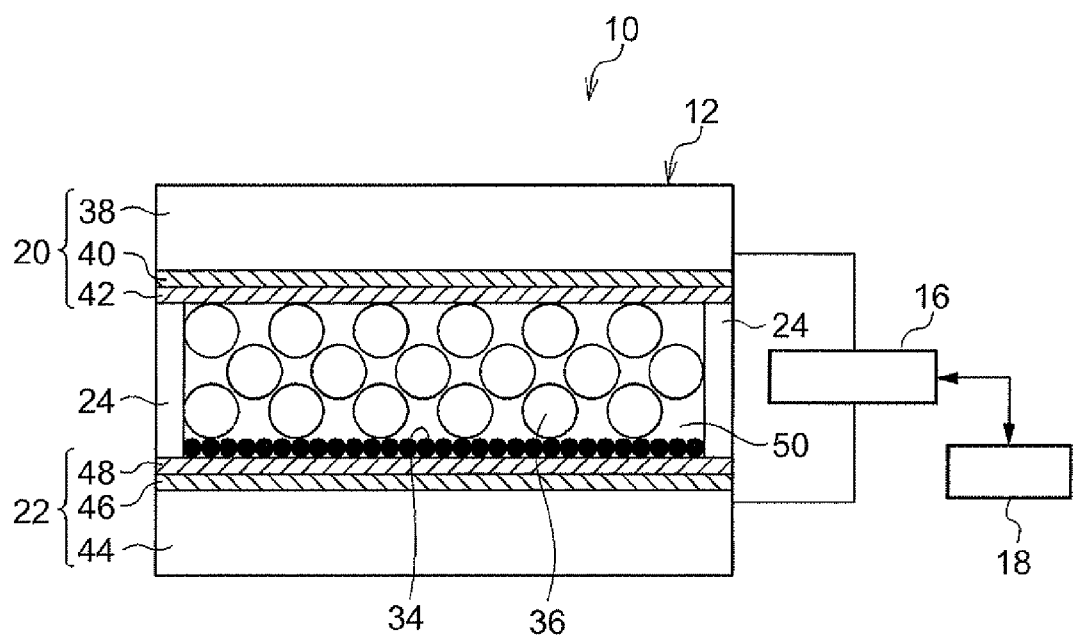
FIG. 1 is a schematic view of a display device according to a first exemplary embodiment of the invention.

In the following, details of the present invention will be described.

<Particles for Display and Particle Dispersion for Display>

The particle dispersion for display according to the invention includes color particles and a silicone polymer attached to a surface of the color particles, the silicone polymer including, as copolymerization components, a first silicone chain component, a second silicone component having a silicone chain that is shorter than a silicone chain of the first silicone component, and a component having a charging group.

The particle dispersion for display according to the invention, attached with a silicone polymer including two kinds of silicone chain components having different silicone chain lengths together with a component having a charging group as copolymerization components, can achieve both dispersion stability and charging property. Although the reason for this is not clear, it is presumed that the component having a longer silicone chain is pushed out by the component having a shorter silicone chain, and the component having a longer silicone chain is oriented outside the color particle, and along with this the component having a charging group is also oriented outside the color particle. In addition, since the longer silicone chain is oriented outside the color particle, the charging group is less likely to be covered by the silicone chain components. Accordingly, it is presumed that the silicone polymer is attached to the surface of color particles while the charging group is oriented outside the color particles together with the silicone chain components, thereby achieving both dispersion stability and charging property.

In the following, the components of the color particles are described.

<Silicone Polymer>

The silicone polymer refers to, for example, a polymer compound having a silicone chain. More specifically, the silicone polymer is a compound having a silicone chain (silicone graft chain) as a side chain with respect to the main chain (trunk polymer chain) of the compound. The silicone polymer may be attached to the surface of the color particles by chemical bonding, or by physical adsorption without chemical bonding.

The silicone polymer is a polymer including at least a first silicone chain component, a second silicone chain component having a silicone chain that is shorter than that of the first silicone chain component, and a component having a charging group as copolymerization components.

The silicone chain (siloxane polymer residue) of the first silicone chain component and the silicone chain of the second silicone chain have different chain lengths, and preferably satisfy a ratio of the silicone chain length of the first silicone chain component to the silicone chain length of the second silicone chain component (silicone chain length of the first silicone chain component; silicone chain length of the second silicone chain component) of from 3:1 or about 3:1 to 20:1 or about 20:1, more preferably from 3:1 to 15:1, further preferably from 3:1 to 10:1. This ratio of silicone chain length indicates the difference in the number of "n" in $-[Si(R)_2-O]_n-$ (R represents a substituent such as a hydroxyl group or a hydrocarbon group). When the ratio of silicone chain length satisfies the above range, both dispersion stability and charging property can be achieved.

The length of the silicone chain in the first silicone chain component (the number of "n" in $-[Si(R)_2-O]_n-$) is preferably from 50 to 300, more preferably from 50 to 250, further preferably from 50 to 200.

On the other hand, the length of the silicone chain in the second silicone chain component (the number of "n" in —[Si(R)$_2$—O]$_n$—) is preferably from 5 to 100, more preferably from 10 to 100, farther preferably from 10 to 30.

The silicone polymer is a copolymer including, as copolymerization components, at least a first silicone chain component, a second silicone component having a silicone chain that is shorter than that of the first silicone component, a component having a charging group, and other optional components. The starting material (monomer) of each component may be a macromonomer. In particular, the starting materials (monomer) for the first and second silicone chain components are preferably a silicone macromer. In other words, the first and second silicone chain components are preferably a silicone macromer component. In this case, a favorable balance between the ratio of existence of the silicone chain components, and achievement of both dispersion stability and charging property can be realized. The term "macromonomer" collectively refers to an oligomer having a polymerizable functional group (polymerization degree: 2 to about 300) and a polymer, which exhibits properties of both a polymer and a monomer. In the following, the term "(meth)acrylate" or the like refers to both "acrylate" and "methacrylate".

The silicone macromer used as a starting material of the first and second silicone chain components is preferably selected from the following silicone macromers.

One preferable example of the silicone macromer is represented by the following Formula (1).

$$X(Y)_q Si(R_5)_{3-r}(Z)_r \qquad \text{Formula (1)}$$

(In Formula (1), X represents an unsaturated group capable of polymerization, Y represents a divalent linkage group, each R$_5$ independently represents a hydrogen atom, an alkyl group, an aryl group or an alkoxy group, Z represents a monovalent siloxane polymer residue having a number average molecular weight of 500 or more, q represents 0 or 1, and r represents an integer of from 1 to 3.)

The number average molecular weight of the silicone macromer is preferably from 500 to 100,000, more preferably from 1,000 to 10,000. The number average molecular weight of the silicone macromer can be measured by gel chromatography using chloroform as a solvent, using polystyrene as a standard material.

In Formula (1), X is preferably a monovalent unsaturated hydrocarbon group having 2 to 6 carbon atoms (such as a CH$_2$=CH— group or a CH$_2$=C(CH$_3$)— group).

Y is preferably a group represented by —COO—, —COO$_a$H$_{2a}$— (a is an integer of from 1 to 5) or a phenylene group, and particularly preferably a group represented by —COOC$_3$H$_6$—.

R$_5$ is preferably a hydrogen atom, an alkyl group having 1 to 5 carbon atoms (such as a methyl group or an ethyl group), an aryl group having 6 to 20 carbon atoms (such as a phenyl group) or an alkoxy group having 1 to 20 carbon atoms (such as a methoxy group), particularly preferably a methyl group.

Z is preferably a monovalent dimethyl siloxane polymer residue having a number average molecular weight of from 500 to 5,000.

q is 0 or 1, preferably 1.

r is an integer of 1 to 3, preferably 1.

Representative examples of the silicone macromer include the following structures represented by Formulae (1-1) to (1-4).

$$CH_2=CR_6—COOC_3H_6—[Si(R_7)_2—O]_b—Si(R_7)_3 \qquad \text{Formula (1-1)}$$

(In the Formula, R$_6$ represents a hydrogen atom or a methyl group, each R$_7$ independently represents a hydrogen atom or a lower alkyl group having 1 to 5 carbon atoms, and b represents an integer of from 5 to 60.)

$$CH_2=CR_6—COO—[Si(R_7)_2—O]_b—Si(R_7)_3 \qquad \text{Formula (1-2)}$$

(In the Formula, R$_6$, each R$_7$ and b have the same definitions as the above.)

$$CH_2=CR_6\text{-Ph-}[Si(R_7)_2—O]_b—Si(R_7)_3 \qquad \text{Formula (1-3)}$$

(In the Formula, Ph represents a phenylene group, and R$_6$, each R$_7$ and b have the same definitions as the above.)

$$CH_2=CR_6—COOC_3H_6—Si(OE)_3 \qquad \text{Formula (1-4)}$$

(In the Formula, R$_6$ has the same definitions as the above, and E represents a group represented by —[Si(R$_7$)$_2$—O]$_c$—Si(R$_7$)$_3$, where R$_7$ has the same definitions as the above and c represents an integer of from 0 to 65.)

Among the above, a silicone macromer represented by Formula (1-1) is preferred, and a silicone macromer represented by the following Formula (2-1a) is particularly preferred.

$$CH_2=C(CH_3)—COOC_3H_6—[Si(CH_3)_2—O]_d—Si(CH_3)_3 \qquad \text{Formula (2-1a)}$$

(In the Formula, d is an integer of from 8 to 40.)

Examples of the silicone macromer having a structure represented by Formula (2-1a) include a dimethyl silicone monomer having a (meth)acrylate group at one terminal end thereof, such as SILAPLANE FM-0711, FM-0721 and FM-0725 (trade name, manufactured by Chisso Corporation), X-22-174DX, X-22-2426 and X-22-2475 (trade name, manufactured by Shin-Etsu Chemical Co., Ltd.)

Examples of the monomer used as a starting material for a component having a charging group include a monomer having a cationic group as a charging group (hereinafter, referred to as a cationic monomer) and a monomer having an anionic group as a charging group (hereinafter, referred to as an anionic monomer). Examples of the cationic group as a charging group include an amino group and a quaternary ammonium group (and a salt of these groups). These cationic groups positively charge the color particles.

Examples of the anionic group as a charging group include a phenol group, a carboxyl group, a carboxylate group, a sulfonic group, a sulfonate group, a phosphoric group, a phosphate group, and a tetraphenyl boron group (and a salt of these groups). These anionic groups negatively charge the color particles.

Examples of the cationic monomer include (meth)acrylates having an aliphatic amino group, such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-ethylaminoethyl(meth)acrylate, N-octyl-N-ethylaminoethyl(meth)acrylate, and N,N-diethylaminoethyl(meth)acrylate; aromatic-substituted ethylene monomers having a nitrogen-containing group, such as dimethylaminostyrene, diethylaminostyrene, dimethylaminomethylstyrene and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; vinylamine; pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidone; imidazoles such as N-vinyl-2-methyl imidazole; imidazolines such as N-vinyl imidazoline, indoles such as N-vinyl indole, indolines such as N-vinyl indoline, carbazoles such as N-vinyl carbazole and 3,6-dibromo-N-vinyl carbazole, pyridines such as 2-vinyl pyridine, 4-vinyl pyridine and 2-methyl-5-vinyl pyridine, piperidines such as (meth)acrylic piperidine, N-vinyl piperidone and N-vinyl piperadine, quinolines such as 2-vinyl quinoline and 4-vinyl quinoline, pyrazoles such as N-vinyl pyrazole and N-vinyl pyrazoline, oxazoles such as 2-vinyl oxazole, and oxazines such as 4-vinyl oxazine and morpholinoethyl(meth)acrylate.

In view of versatility, the cationic monomer is preferably a (meth)acrylate having an aliphatic amino group such as N,N-dimethylaminoethyl(meth)acrylate and N,N-diethylaminoethyl(meth)acrylate. In particular, these monomers are preferably used in the form of a quaternary ammonium salt, before or after the polymerization. The quaternary ammonium salt may be obtained by allowing the monomer to react with an alkyl halide or a tosylate.

Examples of the anionic monomer include carboxylic acid monomers such as (meth)acrylic acid, crotonic acid, itaconic acid, maleic acid, fumaric acid, citraconic acid, anhydrides and monoalkyl esters of these monomers, and vinyl ethers having a carboxyl group such as carboxylethyl vinyl ether and carboxylpropyl vinyl ether;

sulfonic acid monomers such as styrene sulfonic acid, 2-acrylamide-2-methylpropane sulfonic acid, 3-sulfopropyl (meth)acrylic acid ester, bis-(3-sulfopropyl)-itaconic acid ester, a salt of these monomers, as well as other sulfonic acid monoesters such as 2-hydroxyethyl(meth)acrylic acid or a salt of these monomers; and phosphoric acid monomers such as vinyl phosphoric acid, vinyl phosphate, acid phosphoxyethyl(meth)acrylate, acid phosphoxypropyl(meth)acrylate, bis(methacryloyoxyethyl) phosphate, diphenyl-2-methacyloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

The anionic monomer is preferably a monomer having (meth)acrylic acid or sulfonic acid, which is more preferably in the form of an ammonium salt before or after the polymerization. The ammonium salt may be obtained by allowing the monomer to react with a tertiary amine or a quaternary ammonium hydroxide.

Examples of the monomer used as a raw material for the other copolymerization component include a monomer having no charging group, such as a nonionic monomer. Examples of the nonionic monomer include (meth)acrylonitrile, alkyl(meth)acrylate, (meth)acrylamide, ethylene, propylene, butadiene, isoprene, isobutylene, N-dialkyl substituted (meth)acrylamide styrene, styrene derivatives, vinyl carbazole, polyethylene glycol mono(meth)acrylate, vinyl chloride, vinylidene chloride, isoprene, butadiene, N-vinyl pyrrolidone, hydroxyethyl(meth)acrylate, and hydroxybutyl (meth)acrylate.

When the silicone polymer is attached to a surface of color particles via chemical bonding, the monomer used as a starting material for the other copolymerization component may be a monomer having a reactive group. Examples of the monomer having a reactive group include a glycidyl(meth) acrylate having an epoxy group, or an isocyanate monomer having an isocyanate group (such as KARENZ AOI and KARENZ MOI, trade name, manufactured by Showa Denko K.K.)

In the silicone polymer, the weight ratio of the first silicone chain component to the second silicone chain component (first silicone chain component:second silicone chain component) is preferably from 10:1 or about 10:1 to 1:10 or about 1:10, more preferably from 10:2 to 2:10, yet more preferably from 10:3 to 3:10. When the weight ratio is within the above range, achievement of both dispersion stability and charging property can be realized.

Further, the weight ratio of the silicone chain component (first silicone chain component+second silicone chain component):component having a charging group:other component is preferably from 70:10:20 to 10:1:89, more preferably from 60:5:35 to 20:1:79, yet more preferably from 50:5:45 to 30:1:69.

The amount of silicone polymer to be attached to the color particles is preferably from 5 to 80% by weight with respect to the weight of color particles, more preferably from 10 to 70% by weight yet more preferably from 20 to 50% by weight.

The above amount can be measured by subjecting the thus prepared particles for display to centrifugal settling, and then measuring the weight of the same and calculating the increment with respect to the amount of color particles. Alternatively, the above amount may be calculated by composition analysis or thermogravimetric analysis.

<Color Particles>

The color particles may be formed from a colorant itself, or formed from a combination of a colorant, a polymer compound and other optional components. When the color particles are formed from a colorant, a polymer compound and other optional components, the particles may be formed from a polymer in which a colorant is dispersed and compounded, or may be formed from a colorant having a surface coated with a polymer.

Examples of the colorant include a pigment. When the colorant is dispersed and compounded in a polymer, a dye may also be used as the colorant.

The pigment may be either an organic pigment or an inorganic pigment. Examples of the organic pigment include azo pigment, diazo pigment, phthalocyanine pigment, quinacridone pigment, isoindolinone pigment, dioxazine pigment, perylene pigment, perinone pigment, thioindigo pigment, anthraquinone pigment and quinophthalone pigment. The color of the organic pigment is not particularly limited, and pigments having a chromatic color such as red, yellow, blue, orange or green may be used. Specific examples of the organic pigment include C.I. pigment yellow, C.I. pigment red, C.I. pigment violet, C.I. pigment blue, C.I. pigment green, or the like.

Examples of the inorganic pigment include carbon black (such as furnace black, thermal lamp black, acetylene black and channel black), metal oxides (such as titanium oxide, magnesium oxide and zinc oxide), and magnetic powder (such as magnetite and ferrite).

When the colorant is dispersed and compounded in the polymer, the amount of the colorant with respect to the polymer is preferably from 10 to 99% by weight, more preferably from 30 to 99% by weight.

Examples of the polymer include a thermoplastic resin or a thermosetting resin. Examples of the thermoplastic resin include a homopolymer or a copolymer of styrenes (such as styrene and chlorostyrene), monoolefins (such as ethylene, propylene, butylene and isoprene), vinyl esters (such as vinyl acetate, vinyl propionate, vinyl benzoate and vinyl lactate), α-methylene aliphatic monocarboxylates (such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate), vinyl ethers (such as vinyl methyl ether, vinyl ethyl ether and vinyl butyl ether), and vinyl ketones (such as vinyl methyl ketone, vinyl hexyl ketone and vinyl isopropenyl ketone).

Examples of the thermosetting resin include a crosslinked resin (such as a crosslinked copolymer including divinyl benzene as a main component and a crosslinked polymethyl methacrylate), phenol resin, urea resin, melamine resin, polyester resin and silicone resin.

The polymer may be a polymer having a charging group, and examples thereof include a homopolymer of a monomer having a charging group or a copolymer of a monomer having a charging group and other monomer (a monomer having no charging group). The monomer used for the polymer may be those for a silicone polymer as described above.

The copolymerization ratio of a monomer having a charging group to other monomer (a monomer having no charging group) (monomer having a charging group:other monomer) by mole may be selected from the range of from 1:100 to 100:0, for example. The weight average molecular weight of the polymer is preferably from 1,000 to 1,000,000, more preferably from 10,000 to 200,000.

The other components to be compounded in the particles include, for example, a charge control agent or a magnetic material.

The charge control agent may be a known product for use in electrophotographic toners, such as cetylpyridinium chloride, quaternary ammonium salts such as BONTRON P-51, BONTRON P-53, BONTRON E-84, and BONTRON E-81 (trade name, manufactured by Orient Chemical Industries, Co., Ltd.), salicylic metal complexes, phenol condensates, tetraphenyl compounds, metal oxide particles, or metal oxide particles having a surface treated with a coupling agent.

The magnetic material may be an inorganic magnetic material or an organic magnetic material, which may have a color coating as necessary. A transparent magnetic material, particularly a transparent organic magnetic material is preferred since it does not affect the color of the pigment and has a specific gravity that is less than that of inorganic magnetic material.

Examples of the magnetic material having a color coating include the small-diameter colored magnetic powder described in Japanese Patent Application No. 2003-131420, having a color coating formed on a surface of the core magnetic particles. The color coating may be an opaque layer formed from a pigment or the like, but is preferably a light-interference thin film, for example, which is formed from a colorless material such as $SiO_2$ or $TiO_2$ and has a thickness corresponding to a specific light wavelength, and selectively reflects light of the specific wavelength as a result of light interference caused in the thin film.

<Method of Producing Particles for Display>

The method of producing particles for display according to the invention includes, for example, (1) producing a color particle dispersion by dispersing color particles in an organic solvent in which a silicone polymer is dissolved; (2) dropping silicone oil in the color particle dispersion to allow the silicone polymer to precipitate on a surface of the color particles; and (3) removing the organic solvent from the color particle dispersion. By employing a so-called coacervation method, the silicone chain component of the silicone polymer that has precipitated on the surface of color particles may be readily oriented outside the color particles, since the silicone chain component has an affinity to the dropped silicone oil.

The method of producing the particles for display according to the invention is not particularly limited to the above technique, and other methods (such as a technique of attaching a silicone polymer to a surface of color particles by spraying) are also applicable.

In the following, each process of the method of producing the particles for display according to the invention will be described.

(1) Production of Color Particle Dispersion

In this process, color particles as prepared by a known technique (such as pulverization, coacervation, dispersion-polymerization or suspension-polymerization) are mixed in an organic solvent in which a silicone polymer is dissolved and stirred, thereby preparing a color particle dispersion. Alternatively, a silicone polymer may be added during the preparation of color particles by a known technique (such as coacervation, dispersion-polymerization or suspension-polymerization).

The organic solvent may be a solvent that dissolves the silicone polymer, and has (or does not have) compatibility with the silicone oil. Any solvent may be used as long as it causes precipitation of the silicone polymer when the silicone oil is dropped in the dispersion in which the silicone polymer is dissolved, and can be removed thereafter under the condition that the silicone oil does not evaporate, for example, by drying under reduced pressure. Examples of the organic solvent include isopropyl alcohol (IPA), methanol, ethanol, butanol, tetrahydrofuran, ethyl acetate, and butyl acetate. Among these, isopropyl alcohol (IPA) is preferred in view of achieving both dispersion stability and charging property of the particles for display.

(2) Dropping of Silicone Oil

In this process, silicone oil is dropped in the color particle dispersion. When the silicone oil is dropped, a silicone polymer is allowed to precipitate on a surface of the color particles in the color particle dispersion, whereby the silicone polymer is attached to the color particles so as to coat the surface of the same. The color particle dispersion is preferably heated to 40° C. or more for example, preferably 45° C. or more, during the dropping of the silicone oil, since the silicone chain component of the silicone polymer is readily oriented outside the color particles under the temperature of this range. Further, ultrasonic waves may be applied to the color particle dispersion while dropping the silicone oil therein.

(3) Removal of Organic Solvent

In this process, the organic solvent is removed from the color particle dispersion in which the silicone polymer has precipitated on a surface of the color particles. The removal of organic solvent may be conducted by heating the color particle dispersion, heating the same while reducing the pressure, or by a combination of these methods.

When the organic solvent is removed by heating, the temperature of the color particle dispersion is preferably from 40 to 200° C., for example, and more preferably from 60 to 100° C.

When the organic solvent is removed by reducing the pressure, the reduced pressure is preferably from 0.01 to 200 mPa, more preferably from 0.01 to 20 mPa.

Through the above processes, the particles for display according to the invention, or the particle dispersion for display including the same, can be obtained.

The particle dispersion for display according to the invention includes the particles for display as described above and a dispersing medium in which the particles for display are dispersed. As necessary, the particle dispersion for display according to the invention may include an acid, an alkali, a salt, a dispersing agent, a dispersion stabilizer, a stabilizer that inhibits oxidization or absorbs UV rays, an antibacterial agent, an antiseptic agent, or the like.

The dispersing medium may be a known dispersing medium used for a display medium, and silicone oil is one preferable example thereof.

The charge control agent may be used as necessary, and examples thereof include an ionic or nonionic surfactant, a block or graft copolymer having a lipophilic portion and a hydrophilic portion, a compound having a polymeric skeleton of a cyclic, stellate, or dendritic structure, a salicyclic metal complex, a catechol metal complex, a metal-containing bisazo dye, a tetraphenyl borate derivative, and a copolymer of a polymerizable macromer (such as SILAPLANE, trade name, manufactured by Chisso Corporation) and an anionic monomer or a cationic polymer.

Examples of the nonionic surfactant include polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, and fatty acid alkylol amide.

Examples of the anionic surfactant include alkyl benzene sulfonate, alkyl phenyl sulfonate, alkyl naphthalene sulfonate, higher fatty acid salt, a sulfate of higher fatty acid ester, and a sulfonate of higher fatty acid ester.

Examples of the cationic surfactant include a primary to tertiary amine salt, or a quaternary ammonium salt.

The charge control agents is preferably included in an amount of from 0.01 to 20% by weight, particularly preferably from 0.05 to 10% by weight, with respect to the solid content of the particles.

The particles for display and the particle dispersion for display according to the invention are applicable to an electrophoresis display medium, a liquid toner for use in an electrophotographic system employing a liquid developing system, or the like.

<Display Medium and Display Device>

In the following, the display medium and the display device according to the invention will be described.

First Exemplary Embodiment

Figure 2A:
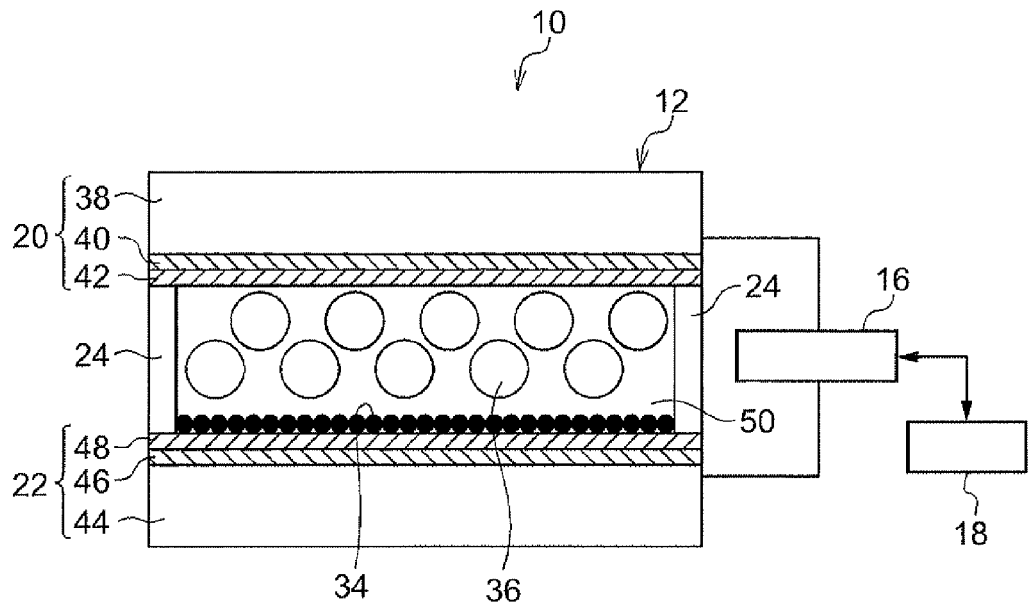
FIGS. 2A and 2B are schematic views showing how the particles move upon application of a voltage between the substrates of the display device according to the first exemplary embodiment of the invention.
Figure 2B:
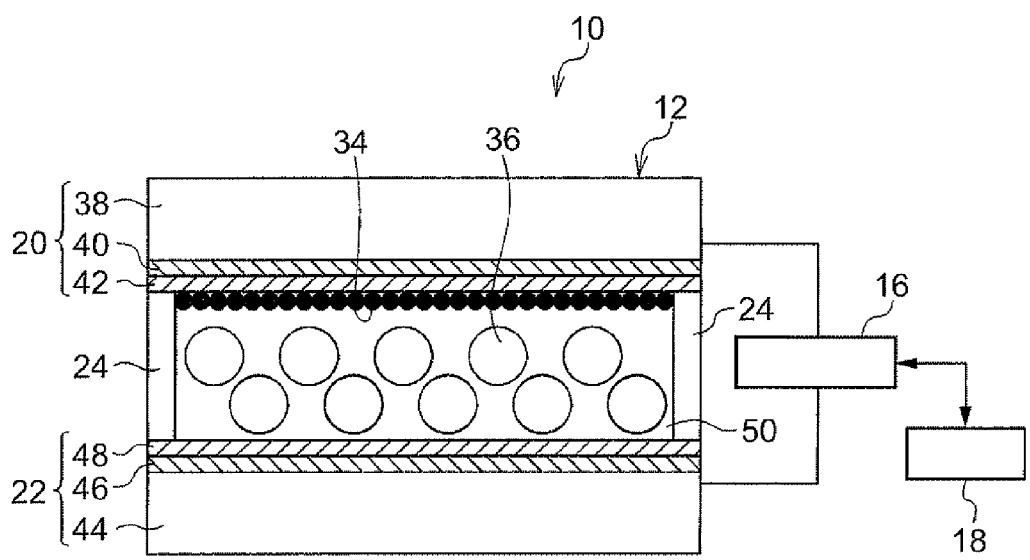

FIG. 1 is a schematic view of a display device according to the first exemplary embodiment. FIGS. 2A and 2B are schematic views showing how the particles move upon application of a voltage between the substrates of the display device according to the first exemplary embodiment of the invention.

Display device 10 according to the first exemplary embodiment includes display medium 12 and display medium 12, the display medium including dispersing medium 50 and particles 34, and the particles for display dispersion according to the invention is used therein.

Display device 10 includes, as shown in FIG. 1, a display medium 12, a voltage applying unit 16 that applies a voltage to display medium 12, and a controller 18.

Display medium 12 includes a display substrate 20 that displays an image; a rear substrate 22 that is positioned opposite to display substrate 20 with a space therebetween; spacers 24 that maintain the substrates to be positioned with a specified space and divide the space between the substrates into plural cells; particles 34 included in each cell; and large particles 36 having a different optical reflection property than that of particles 34.

The cell as mentioned above refers to a space surrounded by display substrate 20, rear substrate 22, and spacers 24. A dispersing medium 50 is enclosed in the cell. Particles 34 are dispersed in dispersing medium 50, and move between display substrate 20 and rear substrate 22 through the gaps among large particles 36 in response to an electric field formed in the cell.

In this exemplary embodiment, particles 34 enclosed in each cell are described as having a single color and are previously treated to be either positively or negatively charged.

It is also possible to design display medium 12 so that the display can be performed at each pixel, by providing spacers 24 to form a cell so as to correspond to each pixel of an image to be displayed.

For the purpose of simplicification, this exemplary embodiment is described by referring to a drawing that shows only a single cell. In the following, details of each component will be described.

Display substrate 20 includes, on a support 38, a front electrode 40 and a surface layer 42 in this order. Rear substrate 22 includes, on a support 44, a rear electrode 46 and a surface layer 48 in this order.

Only display substrate 20, or both display substrate 20 and rear substrate 22 are transparent. In this exemplary embodiment, being transparent refers to having a transmittance with respect to visible rays of 60% or more.

Materials for support 38 and support 44 include glass and plastics such as polyethylene terephthalate resin, polycarbonate resin, acrylic resin, polyimide resin, polyester resin, epoxy resin, and polyether sulfone resin.

Materials for front electrode 40 and rear electrode 46 include oxides of indium, tin, cadmium, antimony or the like, composite oxides such as ITO, metals such as gold, silver, copper or nickel, and organic materials such as polypyrrole or polythiophene. Front electrode 40 and rear electrode 46 may be obtained by forming a material such as those into a single film, a mixed film or a composite film, by a method such as evaporation, sputtering or coating. The thickness of front electrode 40 and rear electrode 46 is typically from 100 to 2,000 angstroms when these electrodes are formed by evaporation or sputtering. Front electrode 40 and rear electrode 46 may be formed in a desired patterned manner by a known method such as etching that is performed to form conventional liquid crystal displays or printed boards. For example, front electrode 40 and rear electrode 46 may be formed in a matrix pattern or a striped pattern that enables passive matrix driving.

Front electrode 40 may be embedded in support 38, or rear electrode 46 may be embedded in support 44. In this case, the material for supports 38 and 44 is selected in accordance with the composition of each kind of particles 34.

Front electrode 40 and rear electrode 46 may be positioned outside display medium 12, separate from display substrate 20 and rear substrate 22, respectively.

In the above description, both display substrate 20 and rear substrate 22 are provided with an electrode (front electrode 40 and rear electrode 46). However, it is also possible to provide an electrode only to one substrate for performing active matrix driving.

In order to enable active matrix driving, a thin film transistor (TFT) may be provided to support 38 and support 44 to each pixel. The TFT is preferably formed on rear substrate 22 rather than on display substrate 20, for ease of forming a multilayer wiring or packaging.

When display medium 12 is driven in a passive matrix manner, configuration of a display device (described later) including display medium 12 can be simplified, while when display medium 12 is driven in an active matrix manner using a TFT, display speed can be improved as compared with the passive matrix driving.

When front electrode 40 and rear electrode 46 are formed on support 38 and support 44, respectively, dielectric films as surface layers 42 and 48 may be formed on front electrode 40 and rear electrode 46, respectively, in order to prevent breakage of front electrode 40 and rear electrode 46 or leakage between the electrodes that causes attachment of particles 34.

Materials for surface layers 42 and 48 include polycarbonate, polyester, polystyrene, polyimide, epoxy, polyisocyanate, polyamide, polyvinyl alcohol, polybutadiene, polymethylmethacrylate, copolymerized nylon, UV-cured acrylic resin, and fluorocarbon resin.

Other than the aforementioned insulating materials, an insulating material in which a charge transporting substance is included is also applicable. Inclusion of a charge transporting substance may bring such effects as improving the charging property of particles due to charges injected to the particles, or stabilizing the amount of charges of the particles by allowing the charges to leak when the amount thereof is increased too much.

Examples of the charge transporting substance include hole transporting substances such as hydrazone compounds, stilbene compounds, pyrazoline compounds, and arylamine compounds; and electron transporting substances such as fluorenone compounds, diphenoquinone compounds, pyrane compounds, and zinc oxide.

A self-supporting resin having a charge transporting property is also applicable. Specific examples thereof include polyvinyl carbazole, and a polycarbonate obtained by polymerizing a specific dihydroxyarylamine and bischloroformate, as described in the U.S. Pat. No. 4,806,443.

The material for the dielectric film is selected in accordance with the composition of the particles or the like, since the dielectric film may affect the charge property or fluidity of the particles. Since display substrate 20 needs to be transparent, the surface layer for display substrate 20 is preferably formed from a transparent material.

Spacers 24 that maintain a space between display substrate 20 and rear substrate 22 are formed so as not to impair the transparency of display substrate 20, and are formed from thermoplastic resin, thermosetting resin, electron beam-curing resin, photo-curing resin, rubber, metal, or the like.

Spacers 24 may be formed in an integrated manner with either display substrate 20 or rear substrate 22. In this case, spacers 24 may be formed by subjecting support 38 or support 44 to an etching treatment, laser treatment, pressing treatment using a predetermined pattern, or printing treatment.

In this case, spacers 24 may be formed on either side of display substrate 20 or rear substrate 22, or may be formed on both sides.

Spacers 24 may have a color or colorless, but is preferably colorless and transparent so as not to affect the image displayed on display medium 12. In this case, for example, spacers 24 are formed from a transparent polystyrene resin, polyester resin, or acrylic resin.

Spacers 24 in the form of particles are also preferably transparent. In this case, spacers 24 are formed from particles of a transparent polystyrene resin, polyester resin, or acrylic resin, and glass particles are also applicable.

Being transparent here refers to having a transmittance of 60% or more with respect to visible rays.

In the following, large particles 36 are described. Large particles 36 are particles that are not charged and have different optical reflection characteristics than that of particles 34, and function as a reflective member that displays a different color than that of particles 34. Further, reflective particle 36 function as a spacer which allows particles 34 to move through the space between display substrate 20 and rear substrate 22 without inhibiting the movement of particles 34. Namely, each particle of particles 34 moves through the gaps among large particles 36 from the side of rear substrate 22 toward the side of display substrate 20, or from the side of display substrate 20 toward the side of rear substrate 22. The color of large particles 36 may be selected so as to be a background color, such as white or black. In this exemplary embodiment, large particles 36 are described as white particles, but the color of large particles 36 is not limited thereto.

Large particles 36 may be, for example, formed by dispersing a white pigment such as titanium oxide, silicon oxide or zinc oxide in a resin such as polystyrene, polyethylene, polypropylene, polycarbonate, PMMA, acrylic resin, phenol resin, formaldehyde condensate, or the like. When large particles 36 have a color other than white, a pigment or a dye of a desired color may be included in the resin particles. The pigment or the dye may be known ones used in printing inks or color toners, such as RGB or YMC colors.

Large particles 36 may be included between the substrates by, for example, an inkjet method. When large particles 36 are fixed, heat (and pressure as necessary) is applied after the inclusion of large particle 36 to melt the surface of the particles, while maintaining the gaps between the particles.

The size of the cell in display medium 12 has a close relationship with the definition of display medium 12, and the definition of the image displayed by display medium 12 can be increased by reducing the size of the cell. The cell typically has a length in a plane direction of display substrate 20 of from 10 µm to 1 mm.

Display substrate 20 and rear substrate 22 can be fixed to each other via spacer 24 using a combination of bolt and nut, a clamp, a clip, a flame for fixing the substrates, or the like. Alternatively, the substrates may be fixed to each other using an adhesive, or by performing hot-melting, ultrasonic bonding, or the like.

Display medium 12 having the aforementioned structure is applicable to media that can record an image or re-writing an image, such as bulletin boards, circulars, electronic black boards, advertisements, billboards, flash signals, electronic paper, electronic newspapers, electronic books, and document sheets for use in both copiers and printers.

As mentioned above, the display device according to this exemplary embodiment includes display medium 12, voltage applying unit 16 that applies a voltage to display medium 12, and controller 18 (see FIG. 1).

Voltage applying unit 16 is electrically connected to front electrode 40 and rear electrode 46. In the following, both of front electrode 40 and rear electrode 46 are described as being electrically connected to voltage applying unit 16. However, it is also possible that one of these electrodes is grounded while the other is electrically connected to voltage applying 16.

Voltage applying unit 16 is connected to controller 18 such that voltage applying unit 16 can send or receive signals.

Controller 18 may be a microcomputer including a CPU (central processing unit) that controls operation of the whole device, a RAM (random access memory) that temporarily records data of various kinds, and a ROM (read only memory) in which programs of various kinds, such as control program for controlling the whole device, are recorded.

Voltage applying unit 16 applies a voltage to front electrode 40 and rear electrode 46 in accordance with instructions from controller 18.

In the following, the function of display device 10 will be described in accordance with the operation of controller 18.

Particles 34 included in display medium 12 are described as black and negatively charged. Dispersion medium 50 is described as transparent and large particles 36 are described as white. Namely, in this exemplary embodiment, display medium 12 displays a black color or a white color depending on the movement of particles 34.

First, an initial operation signal is output to voltage applying unit 16. This signal indicates application of a voltage for a specified time, such that front electrode 40 serves as a negative electrode and rear electrode 46 serves as a positive electrode. When a voltage that is negative and not less than a threshold voltage at which changes in concentration stops is applied between the substrates, particles 34 that are negatively charged move toward the side of rear substrate 22, and reach rear substrate 22 (see FIG. 2A).

At this time, the color of display medium 12 seen from the side of display substrate 20 is a white color of large particles 36.

The time T1 required for the above process may be recorded in advance in a memory such as a ROM (not shown) in controller 18 as information that indicates the time for voltage application in the initial operation, so that this information is read out upon execution of the operation.

Subsequently, when a voltage having a polarity opposite to the voltage that is previously applied between the substrate is applied between the electrodes such that front electrode 40 serves as a positive electrode and rear electrode 46 serves as a negative electrode, particles 34 move toward display substrate 20 to reach display substrate 20. At this time, the color of display medium 12 seen from the side of display substrate 20 is a black color of particles 34 (see FIG. 2B).

Second Exemplary Embodiment

Figure 3:
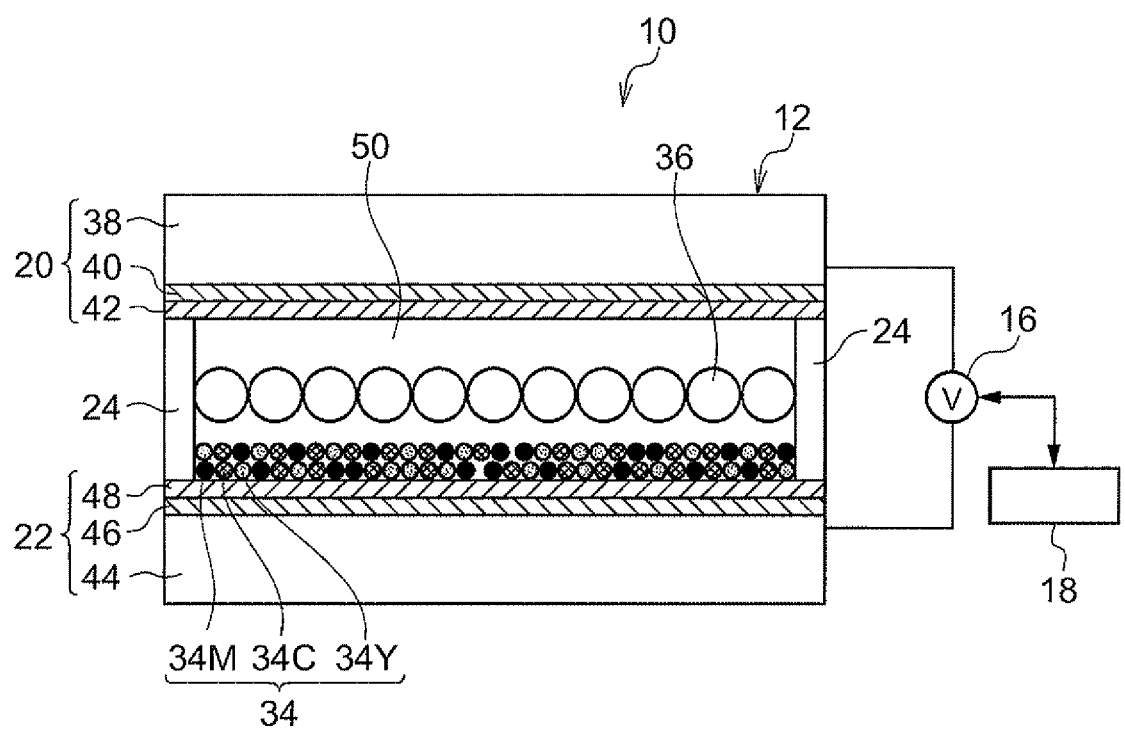
FIG. 3 is a schematic view of a display device according to a second exemplary embodiment of the invention.
Figure 4:
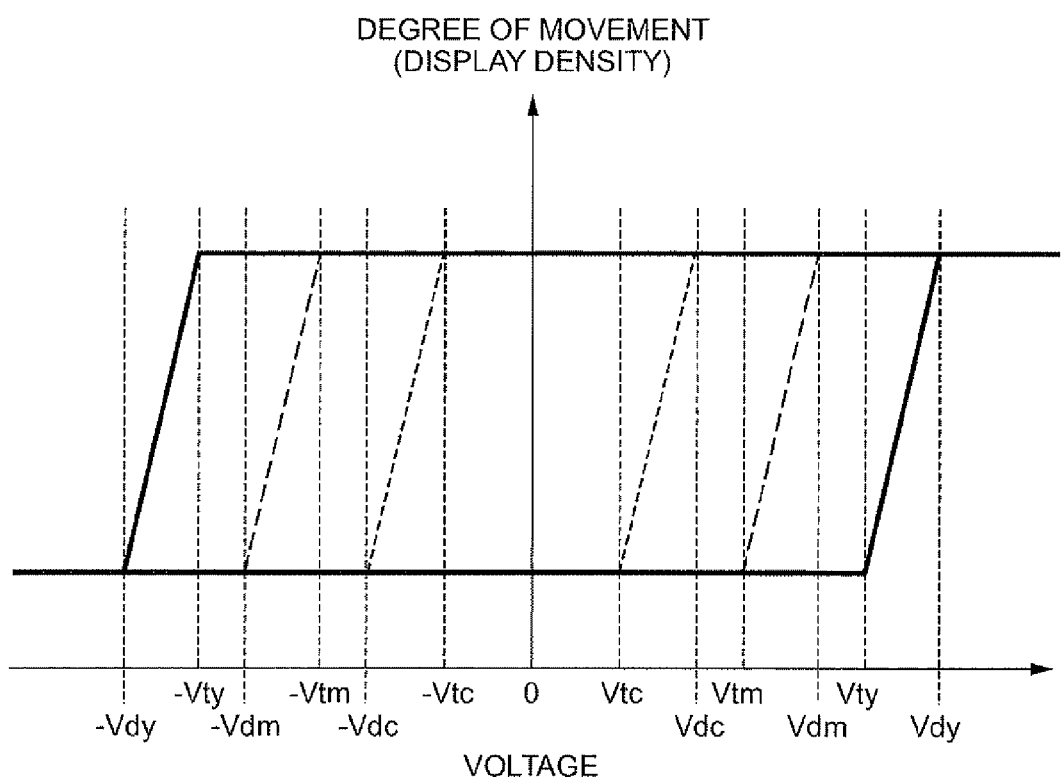
FIG. 4 is a diagram schematically showing the relationship between the voltage and the degree of movement of particles (display density)

In the following, a display device according to the second exemplary embodiment will be described. FIG. 3 is a schematic view of a display device according to the second exemplary embodiment of the invention, FIG. 4 is a diagram schematically showing the relationship between the voltage and the degree of movement of particles (display density), and FIG. 5 is a schematic view showing the relationship between the mode of voltage applied between the substrates of the display medium and the mode of movement of particles.

Display device 10 according to the second exemplary embodiment employs two or more kinds of particles 34, and these two or more kinds of particles 34 are charged to the same polarity.

Display device 10 according to this exemplary embodiment includes, as shown in FIG. 3, display medium 12, voltage applying unit 16 that applies a voltage to display medium 12, and controller 18.

Since display device 10 according to this exemplary embodiment has a similar structure to that of display device 10 according to the first exemplary embodiment, the same components are assigned the same reference numbers and detailed explanations thereof are omitted.

Display medium 12 includes display substrate 20, rear substrate 22 that is positioned opposite to display substrate 20 with a gap therebetween, spacers 24 that retain these substrates to be positioned via a predetermined space and defines the space between the substrates into multiple cells, particles 34 included in each cell, and large particles 36 having an optical reflection characteristics that is different from that of particle 34.

The surfaces of display substrate 20 and rear substrate 22 facing each other are charge-treated as with the case of the first exemplary embodiment, and surface layers 42 and 48 are provided on each of the substrate surfaces.

In this exemplary embodiment, two or more kinds of particles 34 having different colors are dispersed in dispersing medium 50.

In this exemplary embodiment, particles 34 include yellow particles 34Y having a yellow color, magenta particles 34M having a magenta color, and cyan particles 34C having a cyan color. However, particles 34 are not limited to these three colors.

Particles 34 move between the substrates in an electrophoretic manner, and particles of different colors move in response to an electric field at different absolute values of voltage. Namely, yellow particles 34Y, magenta particles 34M and cyan particles 34C move upon application of voltage in a range that is different from each other.

Particles 34 including two or more kinds of particles that move in response to an electric field at different absolute values of voltage can be obtained by preparing particle dispersions each containing particles having different charge amounts, and then mixing these particle dispersions. The charge amount of the particles can be adjusted by, for example, changing the amount of materials for particles 34 as described in the first exemplary embodiment, such as a charge control agent, or changing the type or concentration of the resin that forms the particles.

As mentioned above, display medium 12 according to this embodiment includes three kinds of particles 34 dispersed in dispersing medium 50, i.e., yellow particles 34Y, magenta particles 34M and cyan particles 34C. Particles 34 of different colors move in response to an electric field upon application of a voltage at different absolute values.

In this exemplary embodiment, the absolute value of voltage at which magenta particles 34M start to move is defined as $|Vtm|$, the absolute value of voltage at which cyan particles 34C start to move is defined as $|Vtc|$, and the absolute value of voltage at which yellow particles 34Y start to move is defined as $|Vty|$, respectively. Further, the absolute value of maximum voltage at which substantially all of magenta particles 34M move is defined as $|Vdm|$, the absolute value of maximum voltage at which substantially all of cyan particles 34C move is defined as $|Vdc|$, and the absolute value of maximum voltage at which substantially all of yellow particles 34Y move is defined as $|Vdy|$.

In the following, the absolute values of Vtc, -Vtc, Vdc, -Vdc, Vtm, -Vtm, Vdm, -Vdm, Vty, -Vty, Vdy and -Vdy satisfy the relationship of $|Vtc|<|Vdc|<|Vtm|<|Vdm|<|Vty|<|Vdy|$.

Specifically, as shown in FIG. 4, for example, particles 34 of three kinds are charged to the same polarity and are dispersed in dispersing medium 50, and the range of absolute value of voltage at which cyan particle 34C move $|Vtc \leq Vc \leq Vdc|$ (absolute values between Vtc and Vdc), the range of absolute value of voltage at which magenta particles 34M move $|Vtm \leq Vm \leq Vdm|$ (absolute values between Vtm and Vdm), and the range of absolute value of voltage at which yellow particles 34Y move $|Vty \leq Vy \leq Vdy|$ (absolute values between Vty and Vdy) are set in this order such that these ranges do not overlap each other.

Further, in order to move particles 34 of each color independently from each other, the absolute value of maximum voltage at which substantially all of cyan particles 34C move is less than the range of absolute value of voltage at which magenta particles 34M move $|Vtm \leq Vm \leq Vdm|$ (absolute values between Vtm and Vdm) and the range of absolute value of voltage at which yellow particles 34Y move $|Vty \leq Vy \leq Vdy|$ (absolute values between Vty and Vdy).

Moreover, the absolute value of maximum voltage at which substantially all of magenta particles 34M move is less than the range of absolute value of voltage at which yellow particles 34Y move $|Vty \leq Vy \leq Vdy|$ (absolute values between Vty and Vdy).

Therefore, in this exemplary embodiment, particles 34 of each color can be independently driven by setting the ranges of voltage at which particles 34 of each color move so as not to overlap each other.

The range of voltage at which particles 34 move is from a voltage at which particles start to move to a voltage at which the display density stops to change (saturated) even when the amount of voltage and application time thereof are increased.

Further, the maximum voltage at which substantially all of particles 34 move is a voltage at which the display density stops to change (saturated) even when the amount of voltage and application time thereof are increased since the start of movement.

The term "substantially all" includes the situation that part of particles 34 of each color have different characteristics that do not contribute to the display characteristics due to variation in characteristics of particles 34 of each color.

The "display density" refers to a density at which the density per unit of voltage stops changing (saturated), and is determined by measuring an optical density (OD) of color density at the display side, using a reflective densiometer manufactured by X-Rite, Incorporated, while applying a voltage and changing the voltage between the substrates in a direction of increasing the density as measured (increasing or decreasing the voltage for application) even when the amount of voltage and application time thereof are increased.

In display medium 12 according to this exemplary embodiment, when a voltage is applied between display substrate 20 and rear substrate 22 and gradually increased from 0V to exceed +Vtc, display density starts to change due to the movement of cyan particles 34C. When the voltage is further increased to +Vdc, the display density due to the movement of cyan particles 34C stops changing.

When the voltage is further increased to exceed +Vtm, display density starts to change due to the movement of magenta particles 34M. When the voltage is further increased to +Vdm, the display density due to the movement of magenta particles 34M stops changing.

When the voltage is further increased to exceed +Vty, display density starts to change due to the movement of yellow particles 34Y. When the voltage is further increased to +Vdy, display density due to the movement of yellow particles 34Y stops changing.

Conversely, when a voltage of minus polarity is applied between display substrate 20 and rear substrate 22 and the absolute value of the voltage is gradually increased from 0V to exceed −Vtc, display density starts to change due to the movement of cyan particle 34C. When the absolute value of voltage is further increased to −Vdc, the display density due to the movement of cyan particles 34C stops changing.

When the absolute value of minus voltage is further increased to exceed −Vtm, display density starts to change due to the movement of magenta particles 34M. When the absolute value of voltage is further increased to −Vdm, the display density due to the movement of magenta particles 34M stops changing.

When the absolute value of minus voltage is further increased to exceed −Vty, display density starts to change due to the movement of yellow particles 34Y. When the absolute value of voltage is further increased to −Vdy, the display density due to the movement of yellow particles 34Y stops changing.

Accordingly, in this exemplary embodiment, as shown in FIG. 4, when a voltage in a range of from −Vtc to +Vtc (|Vtc| or less) is applied between display substrate 20 and rear substrate 22, movement of cyan particles 34C, magenta particles 34M and yellow particles 34Y does not occur at such a level that the display density in display medium 12 changes. When a voltage having an absolute value that is more than +Vtc or −Vtc is applied between the substrates, cyan particles 34C (among cyan particles 34C, magenta particles 34M and yellow particles 34Y) start to move at such a level that causes changes in display density in display medium 12, and when a voltage having an absolute value that is more than +Vdc or −Vdc is applied between the substrates, the display density per unit voltage stops changing.

Further, when a voltage in a range of from −Vtm to +Vtm (|Vtm| or less) is applied between display substrate 20 and rear substrate 22, movement of magenta particles 34M and yellow particles 34Y does not occur at such a level that the display density in display medium 12 changes. When a voltage having an absolute value that is more than +Vtm or −Vtm is applied between the substrates, magenta particles 34M (among magenta particles 34M and yellow particles 34Y) start to move at such a level that causes changes in display density in display medium 12, and when a voltage having an absolute value of |Vdm| or more is applied between the substrates, the display density stops changing.

Further, when a voltage in a range of from −Vty to +Vty (|Vty| or less) is applied between display substrate 20 and rear substrate 22, movement of yellow particles 34Y does not occur at such a level that the display density in display medium 12 changes. When a voltage having an absolute value that is more than +Vty or −Vty is applied between the substrates, yellow particles 34Y start to move at such a level that causes changes in display density in display medium 12, and when a voltage having an absolute value of |Vdy| or more is applied between the substrates, the display density stops changing.

Subsequently, the mechanism of how the particles move when an image is displayed in display medium 12 will be described with reference to FIG. 5.

For example, display medium 12 includes yellow particles 34 Y, magenta particles 34M and cyan particles 34C as explained with reference to FIG. 4 as particles 34 of plural kinds.

In the following, the voltage to be applied between the substrates that is more than an absolute value at which yellow particles 34Y start to move but not more than a maximum voltage at which substantially all of yellow particles 34Y move is referred to as "voltage L", the voltage to be applied between the substrates that is more than an absolute value at which magenta particles 34M start to move but not more than a maximum voltage at which substantially all of magenta particles 34M move is referred to as "voltage M", and the voltage to be applied between the substrates that is more than an absolute value at which cyan particles 34C start to move but not more than a maximum voltage at which substantially all of cyan particles 34C move is referred to as "voltage S".

When the voltage applied between the substrates is higher at the side of display substrate 20 than the side of rear substrate 22 is applied between the substrates, the above voltages are referred to as "+voltage L", "+voltage M" and "+voltage S", respectively. When the voltage applied between the substrates is higher at the side of rear substrate 22 than the side of display substrate 20, the above voltages are referred to as "−voltage L", "−voltage M" and "−voltage S", respectively.

As shown in FIG. 5, for example, all of magenta particles 34M, cyan particles 34C and yellow particles 34Y are positioned at the side of rear substrate 22, and a white color is displayed at the initial state (see (A)). When +voltage L is applied between display substrate 20 and rear substrate 22 at this initial state, all of magenta particles 34M, cyan particles 34C and yellow particles 34Y move to the side of display substrate 20. These particles remain at the side of display substrate 20 when the voltage application is stopped at this state, thereby exhibiting a black color formed by subtractive color mixing of magenta, cyan and yellow (see (B)).

Subsequently, when −voltage M is applied between display substrate 20 and rear substrate 22 in the state of (B), magenta particles 34M and cyan particles 34C move to the side of rear substrate 22. As a result, only yellow particles 34Y remain at the side of display substrate 20, thereby exhibiting a yellow color (see (C)).

Further, when +voltage S is applied between display substrate 20 and rear substrate 22 in the state of (C), cyan particles 34C move to the side of display substrate 22. As a result, yellow particles 34Y and cyan particles 34C are positioned at the side of display substrate 20, thereby exhibiting a green color formed by subtractive color mixing of cyan and yellow (see (D)).

When −voltage S is applied between display substrate 20 and rear substrate 22 in the state of (B), cyan particles 34C move to the side of rear substrate 20. As a result yellow particles 34Y and magenta particles 34M are positioned at the side of display substrate 20, thereby exhibiting a red color formed by subtractive color mixing of yellow and magenta (see (I)).

When +voltage M is applied between display substrate 20 and rear substrate 22 in the state of (A), magenta particles 34M and cyan particles 34C move to the side of display substrate 20. As a result, magenta particles 34M and cyan particles 34C are positioned at the side of display substrate 20, thereby exhibiting a blue color formed by subtractive color mixing of magenta and cyan (see (E)).

When −voltage S is applied between display substrate 20 and rear substrate 22 in the state of (E), cyan particles 34C move to the side of rear substrate 22. As a result, only magenta particles 34M are positioned at the side of display substrate 20, thereby exhibiting a magenta color (see (F)).

When −voltage L is applied between display substrate 20 and rear substrate 22 in the state of (F), magenta particles 34M move to the side of rear substrate 22. As a result, no particles are positioned at the side of display substrate 20, thereby exhibiting a white color of large particles 36 (see (G)).

When +voltage S is applied between display substrate 20 and rear substrate 22 in the initial state of (A), cyan particles 34C move to the side of display substrate 20. As a result, cyan particles 34C are positioned at the side of display substrate 20, thereby exhibiting a cyan color (see (H)).

When −voltage L is applied between display substrate 20 and rear substrate 22 in the state of (I), all of particles 34 move to the side of rear substrate 22. As a result, no particles are positioned at the side of display substrate 20, thereby exhibiting a white color of large particles 36 (see (G)).

Similarly, when −voltage L is applied between display substrate 20 and rear substrate 22 in the state of (D), all of particles 34 move to the side of rear substrate 22. As a result, no particles are positioned at the side of display substrate 20, thereby exhibiting a white color of large particles 36 (see (G)).

In this exemplary embodiment, a voltage corresponding to each kind of particles 34 is applied between the substrates. Therefore, desired particles can be selectively moved in response to an electric field formed by the voltage, migration of particles of other colors in dispersing medium 50 can be suppressed, thereby suppressing mixing of an undesired color. As a result, a color can be displayed while suppressing image degradation of display medium 12.

A vivid color can be displayed as long as particle 34 of different colors move upon application of a voltage having different absolute values, even if the ranges of the voltage overlap each other. However, when the ranges of voltage do not overlap each other, mixing of colors can be more suppressed and a more vivid color can be displayed.

Further, by dispersing particles 34 of cyan, magenta and yellow in dispersing medium 50, colors of cyan, magenta, yellow, blue, red, green and black can be displayed and, for example, a white color can be displayed by using large particle 36 having a white color, thereby enabling the display of a specific color.

As mentioned above, in display device 10 according to this exemplary embodiment, the display can be performed by the movement of particles 34 toward display substrate 20 or rear substrate 22.

Examples

In the following, the invention will be described in further details with reference to the Examples, but the invention is not limited thereto.

Example 1

Silicone Polymer A 10 parts by weight of a first silicone macromer (first silicone chain component, SILAPLANE FM-0725, trade name, manufactured by Chisso Corporation, weight average molecular weight Mw: 10,000, silicone chain length (number of "n" in —[Si(R)$_2$—O]$_n$—): 182), 20 parts by weight of a second silicone macromer (second silicone chain component, SILAPLANE FM-0721, trade name, manufactured by Chisso Corporation, weight average molecular weight Mw: 5,000, silicone chain length (number of "n" in —[Si(R)$_2$—O]$_n$—): 67), 20 parts by weight of a monomer having a charging group (component having a charging group, diethylaminoethyl methacrylate) and 50 parts by weight of other monomer (other copolymerization components, hydroxyethyl methacrylate) are mixed in 300 parts by weight of isopropyl alcohol (IPA), and 1 part by weight of AIBN (2,2-azobisisobutylnitrile) is dissolved therein as a polymerization initiator. The mixture is allowed to polymerize under a nitrogen atmosphere at 70° C. for 6 hours. The resulting product is purified using hexane as a re-precipitation solvent and then dried, thereby obtaining a silicone polymer A.

Cyan Particles 1 (Cyan Particle Dispersion 1)

0.5 g of the above silicone polymer A is added to 9 g of isopropyl alcohol (IPA) and dissolved, and then 0.5 g of a cyan pigment (CYANINE BLUE 4973, trade name, manufactured by Sanyo Color Works, Ltd.) is added thereto. The mixture is dispersed for 48 hours using zirconia balls having a diameter of 0.5 mm, and a pigment-containing polymer solution is obtained.

3 g of this pigment-containing polymer solution is heated to 50° C., and 12 g of 2CS silicone oil (KF96, trade name, manufactured by Shin-Etsu Chemical Co., Ltd.) is gradually dropped therein while applying ultrasonic waves. As a result, a silicone polymer is precipitated on a surface of the pigment. Thereafter, the solution is heated to 60° C. and dried with reduced pressure to evaporate the IPA, thereby obtaining cyan particles (particles for display) having a structure in which a silicone polymer is attached to a surface of a pigment. Thereafter, the particles are allowed to settle from the solution using a centrifugal machine and a supernatant liquid is removed. Then, 5 g of the above silicone oil is added thereto and ultrasonic waves are applied thereto, and then washed and the particles are allowed to settle using a centrifugal machine and a supernatant liquid is removed. 5 g of the above silicone oil is further added, and cyan particle dispersion 1 is thus obtained. The volume average particle diameter of the cyan particles is 0.4 µm.

The charging property of the particles in the particle dispersion is evaluated from a direction in which the particles move when the dispersion is enclosed between a pair of electrode substrates and a direct current is applied thereto. As a result, the particles are positively charged.

Example 2

Silicone Polymer B 10 parts by weight of a first silicone macromer (first silicone chain component SILAPLANE FM-0725, trade name, manufactured by Chisso Corporation, weight average molecular weight Mw; 10,000, silicone chain length (number of "n" in $—[Si(R)_2—O]_n—$): 182), 35 parts by weight of a second silicone macromer (second silicone chain component, SILAPLANE FM-0721, trade name, manufactured by Chisso Corporation, weight average molecular weight Mw: 5,000, silicone chain length (number of "n" in $—[Si(R)_2—O]_n—$): 67), 10 parts by weight of a monomer having a charging group (component having a charging group, diethylaminoethyl methacrylate) and 20 parts by weight of a polyalkylene glycol monomethacrylate having an alkyl group at terminal ends, BLEMMER PME-100, trade name, manufactured by NOF Corporation) and 30 parts by weight of vinyl pyrolidone as other components (other copolymerization components) are mixed in 300 parts by weight of isopropyl alcohol (IPA), and 1 part by weight of AIBN (2,2-azobisisobutylnitrile) is dissolved therein as a polymerization initiator. The mixture is allowed to polymerize under a nitrogen atmosphere at 70° C. for 6 hours. The resulting product is purified using hexane as a re-precipitation solvent and then dried, thereby obtaining a silicone polymer B.

Cyan Particles 2 (Cyan Particle Dispersion 2)

0.5 g of the above silicone polymer B is added to 9 g of isopropyl alcohol (IPA) and dissolved, and then 0.5 g of a cyan pigment (CYANINE BLUE 4973, trade name, manufactured by Sanyo Color Works, Ltd.) is added thereto. The mixture is dispersed for 48 hours using zirconia balls having a diameter of 0.5 mm, and a pigment-containing polymer solution is obtained.

3 g of this pigment-containing polymer solution is heated to 40° C., and 12 g of 2CS silicone oil (KF96, trade name, manufactured by Shin-Etsu Chemical Co., Ltd.) is gradually dropped therein while applying ultrasonic waves. As a result, a silicone polymer is precipitated on a surface of the pigment. Thereafter, the solution is heated to 60° C. and dried with reduced pressure to evaporate the IPA, thereby obtaining cyan particles (particles for display) having a structure in which a silicone polymer is attached to a surface of a pigment. Thereafter, the particles are allowed to settle from the solution using a centrifugal machine and a supernatant liquid is removed. Then, 5 g of the above silicone oil is added thereto and ultrasonic waves are applied thereto, and then washed and the particles are allowed to settle using a centrifugal machine and a supernatant liquid is removed. 5 g of the above silicone oil is further added, and cyan particle dispersion 2 is thus obtained. The volume average particle diameter of the cyan particles is 0.2 µm.

The charging property of the particles in the particle dispersion is evaluated from a direction in which the particles move when the dispersion is enclosed between a pair of electrode substrates and a direct current is applied thereto. As a result, the particles are positively charged.

Example 3

Silicone Polymer C 20 parts by weight of a first silicone macromer (first silicone chain component, SILAPLANE FM-0721, trade name, manufactured by Chisso Corporation, weight average molecular weight Mw: 5,000, silicone chain length (number of "n" in $—[Si(R)_2—O]_n—$): 67), 10 parts by weight of a second silicone macromer (second silicone chain component, SILAPLANE FM-0711, trade name, manufactured by Chisso Corporation, weight average molecular weight Mw: 1,000, silicone chain length (number of "n" in $—[Si(R)_2—O]_n—$): 10), 5 parts by weight of a monomer having a charging group (component having a charging group, diethylaminoethyl methacrylate) and 65 parts by weight of vinyl pyrolidone as other component (other copolymerization component) are mixed in 300 parts by weight of isopropyl alcohol (IPA), and 1 part by weight of AIBN (2,2-azobisisobutylnitrile) is dissolved therein as a polymerization initiator. The mixture is allowed to polymerize under a nitrogen atmosphere at 70° C. for 6 hours. The resulting product is purified using hexane as a re-precipitation solvent and then dried, thereby obtaining a silicone polymer C.

Magenta Particles 3 (Magenta Particle Dispersion 3)

0.5 g of the above silicone polymer C is added to 9 g of isopropyl alcohol (IPA) and dissolved, and then 0.5 g of a magenta pigment (PIGMENT RED 3090, trade name, manufactured by Sanyo Color Works, Ltd.) is added thereto. The mixture is dispersed for 48 hours using zirconia balls having a diameter of 0.5 mm, and a pigment-containing polymer solution is obtained.

3 g of this pigment-containing polymer solution is heated to 40° C., and 12 g of 2CS silicone oil (KF96, trade name, manufactured by Shin-Etsu Chemical Co., Ltd.) is gradually dropped therein while applying ultrasonic waves. As a result, a silicone polymer is precipitated on a surface of the pigment. Thereafter, the solution is heated to 60° C. and dried with reduced pressure to evaporate the IPA, thereby obtaining magenta particles (particles for display) having a structure in which a silicone polymer is attached to a surface of a pigment. Thereafter, the particles are allowed to settle from the solution using a centrifugal machine and a supernatant liquid is removed. Then, 5 g of the above silicone oil is added thereto and ultrasonic waves are applied thereto, and then washed and the particles are allowed to settle using a centrifugal machine and a supernatant liquid is removed. 5 g of the above silicone oil is further added, and magenta particle dispersion 2 is thus obtained. The volume average particle diameter of the magenta particles is 0.3 µm.

The charging property of the particles in the particle dispersion is evaluated from a direction in which the particles move when the dispersion is enclosed between a pair of electrode substrates and a direct current is applied thereto. As a result, the particles are positively charged.

Example 4

Cyan Particles 4

Cyan Particle Dispersion 4

Cyan particle dispersion 4 is obtained in a similar manner to Example 1, except that the washing using a centrifugal machine (i.e., a process including allowing the obtained cyan particles to settle using a centrifugal machine, removing a supernatant liquid, adding 5 g silicone oil, applying ultrasonic waves, washing, allowing the particles to settle using a centrifugal machine, removing a supernatant liquid, and further adding 5 g silicone oil) is not conducted.

Example 5

Cyan Particles 5

Cyan Particle Dispersion 5

Cyan particle dispersion 5 is obtained in a similar manner to Example 1, except that the pigment-containing polymer solution is heated to 35° C. while adding 2CS silicone oil in order to allow a silicone polymer to precipitate on a surface of the pigment.

Example 6

Cyan Particles 6

Cyan Particle Dispersion 6

Cyan particle dispersion 6 is obtained in a similar manner to Example 1, except that the silicone polymer is prepared by changing the type and amount of the first silicone macromer (first silicone chain component) and the second silicone macromer (second silicone chain component) as described in Table 1.

Example 7

Cyan Particles 7

Cyan Particle Dispersion 7

Cyan particle dispersion 7 is obtained in a similar manner to Example 1, except that the silicone polymer is prepared by changing the type and amount of the first silicone macromer (first silicone chain component) and the second silicone macromer (second silicone chain component) as described in Table 1.

Comparative Example 1

Comparative Silicone Polymer A 30 parts by weight of a silicone macromer (silicone chain component, SILAPLANE FM-0711, trade name, manufactured by Chisso Corporation, weight average molecular weight Mw: 1,000, silicone chain length (number of "n" in $-[Si(R)_2-O]_n-$): 10), 5 parts by weight of a monomer having a charging group (component having a charging group, diethylaminoethyl methacrylate) and 65 parts by weight of hydroxyethyl methacryltate as other component (other copolymerization component) are mixed in 300 parts by weight of isopropyl alcohol (IPA), and 1 part by weight of AIBN (2,2-azobisisobutylnitrile) is dissolved therein as a polymerization initiator. The mixture is allowed to polymerize under a nitrogen atmosphere at 70° C. for 6 hours. The resulting product is purified using hexane as a re-precipitation solvent and then dried, thereby obtaining a comparative silicone polymer A.

Comparative Magenta Particles 1 (Comparative Magenta Particle Dispersion 1)

0.5 g of the above comparative silicone polymer A is added to 9 g of isopropyl alcohol (IPA) and dissolved, and then 0.5 g of a magenta pigment (PIGMENT RED 3090, trade name, manufactured by Sanyo Color Works, Ltd.) is added thereto. The mixture is dispersed for 48 hours using zirconia balls having a diameter of 0.5 mm, and a pigment-containing polymer solution is obtained.

3 g of this pigment-containing polymer solution is heated to 40° C., and 12 g of 2CS silicone oil (KF96, trade name, manufactured by Shin-Etsu Chemical Co., Ltd.) is gradually dropped therein while applying ultrasonic waves. As a result, a silicone polymer is precipitated on a surface of the pigment. Thereafter, the solution is heated to 60° C. and dried with reduced pressure to evaporate the IPA, thereby obtaining magenta particles (particles for display) having a structure in which a silicone polymer is attached to a surface of a pigment. Thereafter, the particles are allowed to settle from the solution using a centrifugal machine and a supernatant liquid is removed. Then, 5 g of the above silicone oil is added thereto and ultrasonic waves are applied thereto, and then washed and the particles are allowed to settle using a centrifugal machine and a supernatant liquid is removed. 5 g of the above silicone oil is further added, and comparative magenta particle dispersion 1 is thus obtained. The volume average particle diameter of the magenta particles is 0.4 μm.

The charging property of the particles in the particle dispersion is evaluated from a direction in which the particles move when the dispersion is enclosed between a pair of electrode substrates and a direct current is applied thereto. As a result, the particles are positively charged.

Comparative Example 2

Comparative Silicone Polymer B 30 parts by weight of a silicone macromer (silicone chain component, SILAPLANE FM-0725, trade name, manufactured by Chisso Corporation, weight average molecular weight Mw: 10,000, silicone chain length (number of "n" in $-[Si(R)_2-O]_n-$): 182), 5 parts by weight of a monomer having a charging group (component having a charging group, diethylaminoethyl methacrylate) and 65 parts by weight of hydroxyethyl methacryltate as other component (other copolymerization component) are mixed in 300 parts by weight of isopropyl alcohol (IPA), and 1 part by weight of AIBN (2,2-azobisisobutylnitrile) is dissolved therein as a polymerization initiator. The mixture is allowed to polymerize under a nitrogen atmosphere at 70° C. for 6 hours. The resulting product is purified using hexane as a re-precipitation solvent and then dried, thereby obtaining a comparative silicone polymer B.

Comparative Magenta Particles 2 (Comparative Magenta Particle Dispersion 2)

0.5 g of the above comparative silicone polymer B is added to 9 g of isopropyl alcohol (IPA) and dissolved, and then 0.5 g of a magenta pigment (PIGMENT RED 3090, trade name, manufactured by Sanyo Color Works, Ltd.) is added thereto. The mixture is dispersed for 48 hours using zirconia balls having a diameter of 0.5 mm, and a pigment-containing polymer solution is obtained.

3 g of this pigment-containing polymer solution is heated to 40° C., and 12 g of 2CS silicone oil (KF96, trade name, manufactured by Shin-Etsu Chemical Co., Ltd.) is gradually dropped therein while applying ultrasonic waves. As a result, a silicone polymer is precipitated on a surface of the pigment.

Thereafter, the solution is heated to 60° C. and dried with reduced pressure to evaporate the IPA, thereby obtaining magenta particles (particles for display) having a structure in which a silicone polymer is attached to a surface of a pigment. Thereafter, the particles are allowed to settle from the solution using a centrifugal machine and a supernatant liquid is removed. Then, 5 g of the above silicone oil is added thereto and ultrasonic waves are applied thereto, and then washed and the particles are allowed to settle using a centrifugal machine and a supernatant liquid is removed. 5 g of the above silicone oil is further added, and comparative magenta particle dispersion 1 is thus obtained. The volume average particle diameter of the magenta particles is 0.4 μm.

The charging property of the particles in the particle dispersion is evaluated from a direction in which the particles move when the dispersion is enclosed between a pair of electrode substrates and a direct current is applied thereto. As a result, the particles are positively charged.

Dispersion Stability Evaluation

The particle dispersions as prepared in the above Examples and Comparative Examples are left to stand for 10 days. Thereafter, the dispersion stability is evaluated by observing the state of settling of the particles.

A: No settling is observed or a slight degree of settling is observed at a lower portion of the dispersion.

B: Settling is observed, but the density of the whole dispersion is not changed.

C: A significant level of settling is observed, and an upper portion of the dispersion is transparent.

Display Properties

A pair of electrode substrates formed from ITO (indium tin oxide) coated with a $SiO_2$ film are prepared and positioned to face each other via a gap of 50 μm therebetween, and the side of the same is sealed while leaving an opening. Thereafter, the particle dispersion as prepared in each of the above Examples and Comparative Examples are injected from the opening into a space between the electrode substrates, as well as the white particles as described below, and then the opening is sealed. Subsequently, a DC voltage (20V) is alternately applied to the electrode substrates to perform color display for 50 times. Then, display properties while displaying a color of white, cyan and magenta are evaluated in accordance with the following criteria.

A: The cyan or magenta color is clearly displayed, and the white color is also clearly displayed.

B: The cyan or magenta color is clearly displayed, but the white color is mixed with a cyan or magenta color of the color particles to some degree.

C: The white color is mixed with a cyan or magenta color of the color particles, thereby exhibiting a poor contrast with respect to the color display of cyan or magenta.

Storage Stability

The storage stability of the particle dispersion is evaluated by leaving the particle dispersion to stand for 20 days and then visually observing the state of color display again, in accordance with the following criteria.

A: Favorable charging stability and a high degree of contrast with respect to a white color are achieved. As a result, favorable white display and color display are performed.

B: The charging level is slightly lowered and the amount of particles charged to an opposite polarity is increased. The white color is mixed with a cyan or magenta color to some extent. However, the white color can be clearly distinguished from the cyan or magenta display, and the display level is tolerable for use.

C: The charging level is slightly lowered and the amount of particles charged to an opposite polarity is significantly increased. The white color is distinctly mixed with a cyan or magenta color, so the white color cannot be distinguished from the cyan or magenta color display. Therefore, the display level is not tolerable for use.

(White Particles (White Particle Dispersion))

Preparation of Dispersion A1

Dispersion A1 is prepared by mixing the following components and dispersing the same in a ball mill using zirconia beads having a diameter of 10 mm for 20 hours.

<Components>

| | |
|---|---|
| Cyclohexyl methacrylate | 61 parts by weight |
| Divinyl methoxysilane | 1 part by weight |
| Titanium oxide 1 (white pigment) (Volume average particle diameter: 0.3 μm, TIPAQUE CR63, trade name, manufactured by Ishihara Sangyo Kaisha, Ltd.) | 35 parts by weight |
| Hollow particles (primary particle diameter: 0.3 μm) (SX866(A), trade name, manufactured by JSR Corporation) | 3 parts by weight |
| Charge control agent (SBT-5-0016, trade name, manufactured by Orient Chemical Industries, Co., Ltd.) | 1 part by weight |

Preparation of Calcium Carbonate Dispersion B1

Calcium carbonate dispersion B1 is prepared by mixing the following components and dispersing the same in a ball mill in a similar manner to the above process.

<Components>

| | |
|---|---|
| Calcium carbonate | 40 parts by weight |
| Water | 60 parts by weight |

Preparation of Mixed Solution C1

Mixed solution C1 is prepared by mixing the following components and degassing the same for 10 minutes using an ultrasonic machine, and then stirring the same using an emulsifier.

<Components>

| | |
|---|---|
| Calcium carbonate dispersion B1 | 8.5 g |
| 20% salt water | 50 g |

Preparation of White Particles (White Particle Dispersion)

35 g of the above dispersion A1, 1 g of ethylene glycol dimethacrylate and 0.35 g of AIBN (azobisisobutylonitrile) are measured and thoroughly mixed, and then degassed for 2 minutes using an ultrasonic machine. The resultant is added to mixed solution C1 and emulsified using an emulsifier. The obtained emulsion is placed in a bottle and sealed with a silicone cap, and then thoroughly degassed with reduced pressure using a syringe needle and the bottle is filled with a nitrogen gas. This is allowed to react at 65° C. for 15 hours to produce particles. The obtained particle powder is dispersed in ion exchange water and the calcium carbonate is allowed to decompose with hydrochloric acid water, and then filtered. The resultant is washed with a sufficient amount of distilled water to obtain unclassified white particles. The particle size of the white particles is regulated by using nylon sieves having an opening of 10 μm and 15 μm, respectively, and then dried. White particles having a volume average particle size of 13 μm and a specific gravity of 1.7 are thus obtained. The obtained white particles are dispersed in 20 g of 2CS silicone oil (KF96, trade name, manufactured by Shin-Etsu Chemical Co., Ltd.), thereby obtaining a white particle dispersion.

The charging property of the particles in the particle dispersion is evaluated from a direction in which the particles move when the dispersion is enclosed between a pair of electrode substrates and a direct current is applied thereto. As a result, the particles are not charged, or positively charged to some extent.

Further, when the particles for display (color particles) as prepared above and the white particles are mixed, the white particles are negatively charged and the particles for display (color particles) are positively charged.

TABLE 1

|  | Silicone polymer | | | | | | Evaluation | | |
|---|---|---|---|---|---|---|---|---|---|
|  | First silicone macromer | | | Second silicone macromer | | | | Display property | |
|  | Type | Silicone chain length (number of n) | Parts by weight | Type | Silicone chain length (number of n) | Parts by weight | Dispersion stability | (stability in repeated display) | Storage stability |
| Ex. 1 | SILAPLANE FM-0725 | 182 | 10 | SILAPLANE FM-0721 | 67 | 20 | A | A | A |
| Ex. 2 | SILAPLANE FM-0725 | 182 | 10 | SILAPLANE FM-0721 | 67 | 35 | A | A | A |
| Ex. 3 | SILAPLANE FM-0721 | 67 | 20 | SILAPLANE FM-0711 | 10 | 10 | A | A | A |
| Ex. 4 | SILAPLANE FM-0725 | 182 | 10 | SILAPLANE FM-0721 | 67 | 20 | B | B | B |
| Ex. 5 | SILAPLANE FM-0725 | 182 | 10 | SILAPLANE FM-0721 | 67 | 20 | B | B | B |
| Ex. 6 | SILAPLANE FM-0725 | 182 | 5 | SILAPLANE FM-0711 | 10 | 35 | B | B | B |
| Ex. 7 | SILAPLANE FM-0721 | 67 | 3 | SILAPLANE FM-0711 | 10 | 25 | B | B | B |
| Com. Ex. 1 | SILAPLANE FM-0711 | 10 | 30 | — | — | — | C | C | C |
| Com. Ex. 2 | SILAPLANE FM-0725 | 182 | 30 | — | — | — | A | C | C |

As shown in the results described in Table 1, the particle dispersions prepared in the Examples achieve both dispersion stability and display property, as compared with the particles dispersions prepared in the Comparative Examples.

All publications, patent applications, and technical standards mentioned in this specification are herein incorporated by reference to the same extent as if each individual publication, patent application, or technical standard was specifically and individually indicated to be incorporated by reference.

What is claimed is:

1. Particles for display comprising color particles and a silicone polymer attached to a surface of the color particles, the silicone polymer comprising, as copolymerization components, a first silicone chain component, a second silicone component comprising a silicone chain that is shorter than a silicone chain of the first silicone component, and a component comprising a charging group.

2. The particles for display according to claim 1, wherein at least one of the first silicone chain component or the second silicone component comprises a silicone macromer component.

3. The particles for display according to claim 1, wherein a ratio of silicone chain length of the first silicone chain component to the second silicone chain component is from about 3:1 to about 20:1.

4. The particles for display according to claim 1, wherein a ratio of weight of the first silicone chain component to the second silicone chain component is from about 10:1 to about 1:10.

5. A particle dispersion for display comprising particles for display and a dispersing medium in which the particles for display are dispersed, the particles for display comprising color particles and a silicone polymer attached to a surface of the color particles, the silicone polymer comprising, as copolymerization components, a first silicone chain component, a second silicone component comprising a silicone chain that is shorter than a silicone chain of the first silicone component, and a component comprising a charging group.

6. The particle dispersion for display according to claim 5, wherein at least one of the first silicone chain component or the second silicone component comprises a silicone macromer component.

7. The particle dispersion for display according to claim 5, wherein a ratio of silicone chain length of the first silicone chain component to the second silicone chain component is from about 3:1 to about 20:1.

8. The particle dispersion for display according to claim 5, wherein a ratio of weight of the first silicone chain component to the second silicone chain component is from about 10:1 to about 1:10.

9. A display medium comprising:
a pair of substrates, at least one of the pair of substrates being transparent; and
a particle dispersion comprising particles for display and a dispersing medium in which the particles for display are dispersed,
the particles for display comprising color particles and a silicone polymer attached to a surface of the color particles, the silicone polymer comprising, as copolymerization components, a first silicone chain component, a second silicone component comprising a silicone chain that is shorter than a silicone chain of the first silicone component, and a component comprising a charging group.

10. The display medium according to claim 9, wherein at least one of the first silicone chain component or the second silicone component comprises a silicone macromer component.

11. The display medium according to claim 9, wherein a ratio of silicone chain length of the first silicone chain component to the second silicone chain component is from about 3:1 to about 20:1.

12. The display medium according to claim 9, wherein a ratio of weight of the first silicone chain component to the second silicone chain component is from about 10:1 to about 1:10.

13. A display device comprising the display medium according to claim 9 and a voltage applying unit that applies a voltage to the pair of substrates.

14. The display device according to claim 13, wherein at least one of the first silicone chain component or the second silicone component comprises a silicone macromer component.

15. The display device according to claim 13, wherein a ratio of silicone chain length of the first silicone chain component to the second silicone chain component is from about 3:1 to about 20:1.

16. The display device according to claim 13, wherein a ratio of weight of the first silicone chain component to the second silicone chain component is from about 10:1 to about 1:10.

* * * * *